United States Patent [19]
Costantini et al.

[11] 3,973,260
[45] Aug. 3, 1976

[54] DISPERSED PULSE MEASUREMENT FOR AGC AND DYNAMIC THRESHOLDING OF A CHIRPED RADAR RECEIVER

[75] Inventors: Ralph J. Costantini, Millburn, N.J.; Charles R. Parsons, Broomfield, Colo.; Stanley J. Schretter, Flanders, N.J.

[73] Assignee: The United States of America as represented by the Secretary of the Army, Washington, D.C.

[22] Filed: Sept. 6, 1974

[21] Appl. No.: 503,827

[52] U.S. Cl. ......................................... 343/17.2 PC
[51] Int. Cl.² ..................... G01S 7/30; G01S 9/233
[58] Field of Search ................. 343/17.2 R, 17.2 PC

[56] References Cited
UNITED STATES PATENTS

| | | | |
|---|---|---|---|
| 3,114,909 | 12/1963 | Varela | 343/17.2 R |
| 3,261,969 | 7/1966 | Routh | 343/17.2 PC |
| 3,639,695 | 2/1972 | Bertheas | 343/17.2 PC X |
| 3,679,983 | 7/1972 | Theriot | 343/17.2 PC X |
| 3,718,929 | 2/1973 | Van Horn | 343/17.2 R |

*Primary Examiner*—Malcolm F. Hubler
*Attorney, Agent, or Firm*—Lawrence A. Neureither; Jack W. Voigt; Robert C. Sims

[57] ABSTRACT

Pulse measurement of chirped radar returns is made before dechirping by the use of a linear detector averaging circuits and time delay circuits such that the measurement is indicative of the RMS power of the pulse. Depending on the received chirp pulse different averaging circuits and time delay circuits are switched in so that its output is coincidental with the delayed dechirped signal. Output is encoded for a digital indication of the power and is fed through scalers to set the threshold of the video signal processor.

8 Claims, 2 Drawing Figures

DISPERSED PULSE MEASUREMENT FOR AGC AND DYNAMIC THRESHOLDING OF A CHIRPED RADAR RECEIVER

SUMMARY OF THE INVENTION

Subject invention is basically a signal processor whose output is used for two distinct purposes. The first purpose is for automatic gain control of a receiver. The second purpose is to derive a dynamic threshold voltage which is used to reject the spurious portion (in the case of chirp radar these are termed "range sidelobes") of the primary signal. In any type of signal processing, spurious portions of the primary signal exist. It is feasible to use the subject device for rejection of spurious portions of the received signal for any pulsed frequency or phase modulated signal. The range sidelobe rejection capabilities of the threshold voltage are designed such that they are not impaired by multiple return signals or by signals returned from objects with dimensions much larger than the resolution capability of the receiver. The ratio between the threshold level and the range sidelobes remain constant regardless of the nature of the radar target or targets from which the received signal is obtained.

DESCRIPTION OF THE PREFERRED EMBODIMENT

Figure 1:
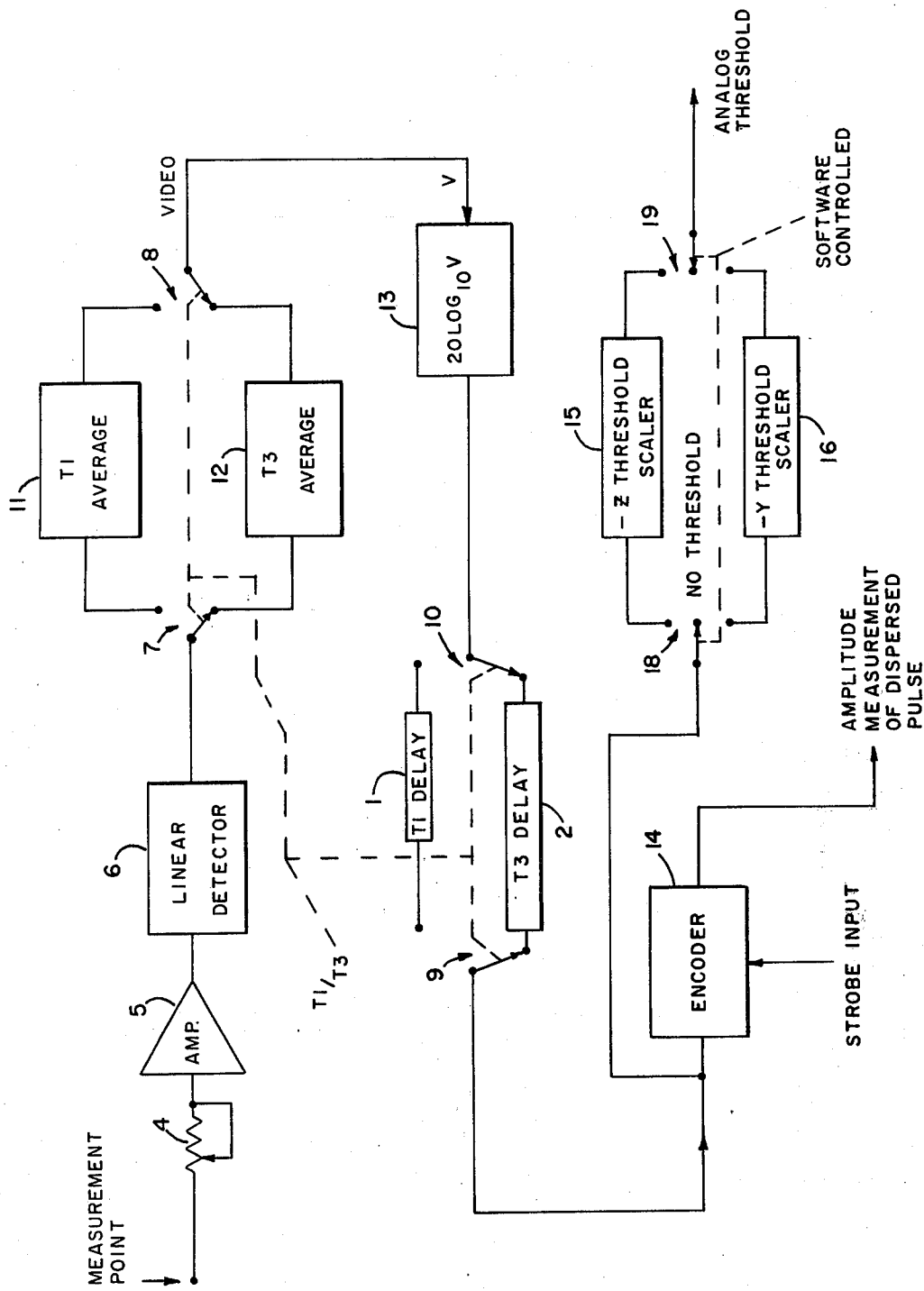
FIG. 1 is a block diagram of the dispersed pulse measurement device of the present invention.

FIG. 1 shows a device which provides an estimate of the RMS power for each radar return by making a measurement of the radar returns before dechirping (dispersed pulse measurement). The purpose of this measurement is to effect AGC control which minimizes the possibility of receiver saturation (in multiple and/or extended target environment) in those portions of the receiver which process the chirped pulse. Also it detects receiver saturation in those portions of the receiver before the dechirped network. This estimate of RMS power is further used as a threshold signal for the video signal processor.

The terms "T1 waveform" and "T3 waveform" are nomenclature referring to radar signals peculiar to the SAFEGUARD System Missile Site Radar (MSR). Both the T1 and T3 waveforms are chirped radar waveforms. The T1 waveform is a pulse of M microseconds (M $\mu$sec) in duration. Its frequency is varied linearly over an L megahertz (L MHz) bandwidth. The T3 waveform is conceptually the same as T1 but the T3 waveform is 6M microseconds (6M $\mu$sec) in duration and has an L/10 megahertz (L/10 MHz) bandwidth. Because these waveforms have different parameters, they are processed through separate circuits both within the primary radar receiver and the dispersed pulse measurement device depicted in FIG. 1 of the referenced memorandum. The T1 waveform having an L MHz bandwidth has a higher resolution than the T3 waveform which has an L/10 MHz bandwidth. Because the peak transmitted power is the same for both waveforms, the T3 waveform having a pulse duration of 6M $\mu$sec yields a higher signal-to-noise ratio than the T1 waveform which has an M $\mu$sec pulse width when reflected from the same radar target. It is important to note that the specific parameters of these waveforms (i.e., their bandwidth and pulse duration) have no bearing on the concept of the device, as the device can be used in other radar systems having different parameters.

As stated above, the T1 and T3 waveforms are processed through separate primary receiver circuitry. Inherent in the design of chirped radar receivers are delays necessary to process the received signals. Generally speaking, the longer the pulse duration, the longer the delay necessary to process the signal. In the MSR, this processing delay amounts to approximately three times the pulse duration. Hence for the T1 waveform (L $\mu$sec pulse duration) the processing delay through the primary signal processor is approximately 3L $\mu$sec. Likewise the processing delay for the T3 waveform (6L $\mu$sec pulse duration) is approximately 18L $\mu$sec.

Figure 2:
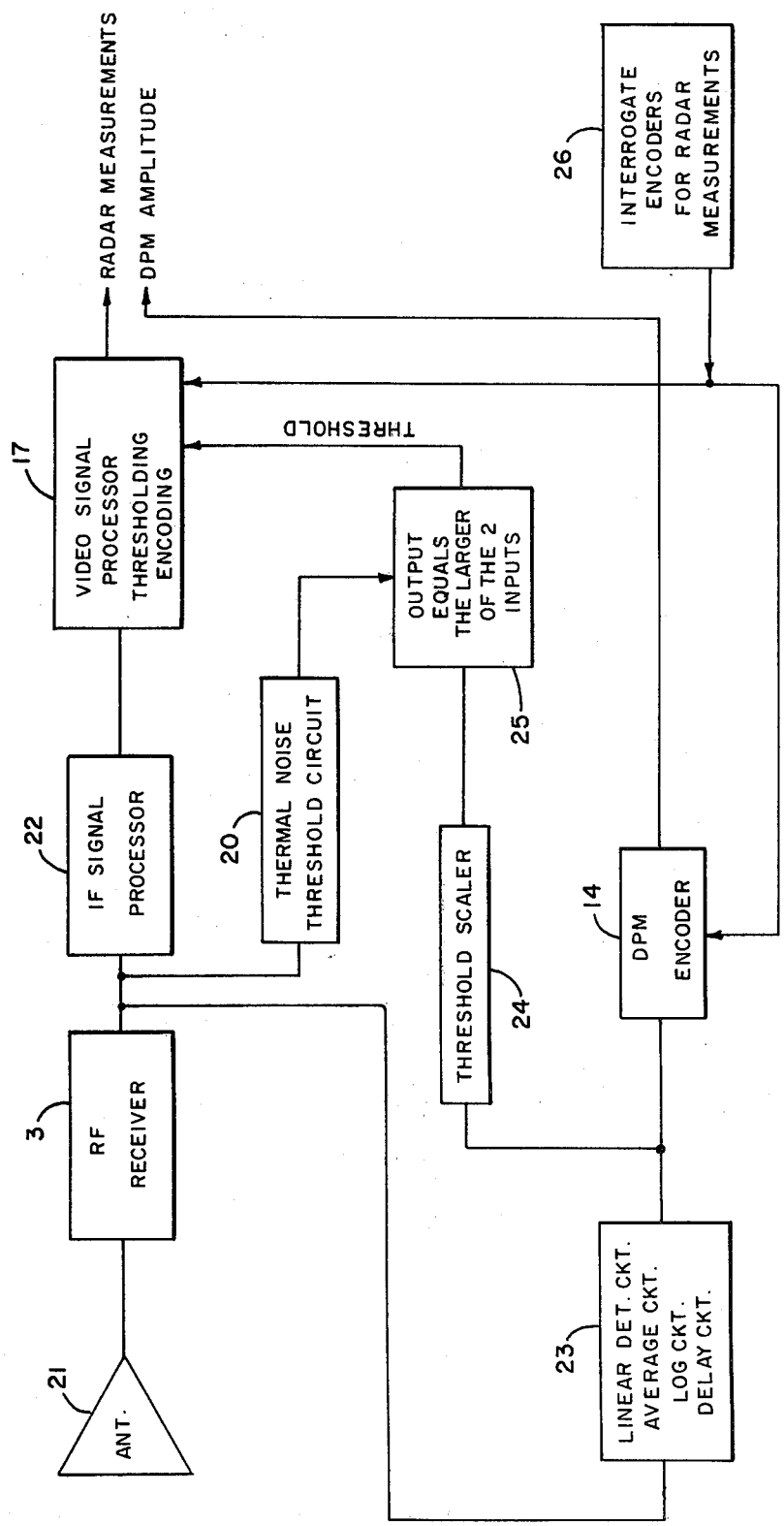
FIG. 2 is a block diagram illustrating the location of the dispersed pulse measurement device in a radar system.

The relative timing between the primary radar processor of FIG. 2 and the device of FIG. 1 for a particular waveform (i.e., either T1 or T3 in this particular application) must be such that the peak value through each path (i.e., the primary signal path and the device path) be time coincident with when radar measurements are performed. Delay incurred by signal processing through the primary receiver is longer than the processing delay of the device in FIG. 1 if the delay circuitry 1 and 2 depicting therein was omitted. Thus, the purpose of delays 1 and 2 in FIG. 1 is to make the outputs of the device therein depicted time coincident with outputs of the primary radar signal processing circuits.

For the sake of clarity a discussion of the T1 average block 11 in FIG. 1 will follow. The T1 average block 11 performs the identical function as the T3 average block 12 but has circuit parameters consistent with the T1 waveform. The purpose of the T1 average block is to measure the average input voltage to that block during the same time interval during which the radar return pulse is received. (Note this circuit averages continuously but, as previously described, the T1 delay 1 depicted in FIG. 1 is such that the peak output of the device therein described is time coincident with the peak output of the primary T1 waveform signal processing path.) This measure of average voltage is used to estimate the RMS power (in decibels) in the receive time interval by taking 20 $\log_{10}$ (average voltage).

The T3 averaging circuit 12 is identical in function to that described for T1 but it is matched to the T3 waveform. Circuits such as those labeled "T1 average" and "T3 average" c[n be the same as those which are used to process pulsed continuous wave radar signals.

Referring to FIG. 1 the measuring point of the device is connected to the RF receiver output 3 as indicated in FIG. 2. The received chirped pulse is attenuated by attenuator 4 and amplified by amplifier 5 whose output is sent to a linear detector 6. Linear detector 6 serves to remove the modulations from the received signal and presents to the input of the appropriate averaging block the rectified envelope of the received signal (i.e., either T1 or T3). A switching arrangement 7–10 is preset so as to select the appropriate averaging circuits and delay circuits.

Averaging circuits 11 and 12 are essentially matched filters for the rectified envelope of the received signal. However, they may take any of the well known designs of the averaging circuits. Averaging circuits 11 and 12 perform the function of measuring the average voltage over a time period roughly equal to (but somewhat less than) the received pulse duration.

A logarithmic amplifier 13 converts linearly varying voltage V into ten times the logarithm of $V^2$ which is an estimate of the root means square power of the received signal in decibels. The output of the logarithmic amplifier is fed through the delay circuits 1 and 2 whereby the measurement is delayed the same amount that the processed pulse is delayed by the dechirping.

Encoder 14 converts the analog signal output of delay circuit 1 or 2 into a digital format. Encoder 14 is interrogated at the same time as the sum channel amplitude encoder of the primary radar. Any of the well known encoders may be used. A minimum of two bits of encoded data will effect an AGC scheme and indicate dispersed receiver saturation. These two bits of data shall report the dispersed pulse measurement amplitude to be in one of four amplitude regimes.

Z threshold scaler 15 and Y threshold scaler 16 are provided to develop the dispersed pulse measurement threshold for the video signal processor 17 of FIG. 2. This threshold is selected by switches 18 and 19 and is used as the radar threshold when its amplitude exceeds the amplitude of the thermal noise threshold circuit 20.

FIG. 2 shows the disperse pulse measurement device inserted into a chirped radar receiver system. Antenna 21 receives returns and feeds them to RF receiver 3. RF receiver 3 has an output which is fed to the IF signal processor 22, the thermal noise threshold circuit 20, and the linear detecting etc. circuits 23. The output of threshold scaler 24 is an analog signal representative of the RMS value of a pulse received by the receiver. The value of this signal is compared with the output of thermal noise threshold circuit 20, and the greater signal is sent on to the threshold input of the video signal processor 17. A greatest of circuit 25 compares the two signals. Range marks on signals whose amplitudes are less than the threshold value and force shall be inhibited. All ranges marks above the threshold and force shall be reported by the video signal processor 17. When the dispersed threshold is not engaged by switches 18 and 19 (FIG. 1), the threshold will be only in accordance with the thermal noise threshold circuit 20.

Dispersed pulse measurement can be used to eliminate range marking on sidelobes. Since the measurement is made prior to the dechirp networks (which have long inherent time delays), sufficient time is available to make the measurement and set a threshold level on the collapsed video by the time the video arrives at the video signal processor. The analog threshold on the collapsed sum channel video can be set Y dB down (for range sidelobe rejection) from the expected target peak amplitude as estimated from the dispersed pulse measurement. A judicious choice of Y would eliminate range marks on sidelobes at the expense of masking low signal-to-noise detections within approximately 10 miles (T3 waveform) of the detected target. Timing of the analog threshold is inherent in the hardware in that the threshold is always time aligned with the target return. In both search and verification modes, such analog timing is provided since there is little or no knowledge of the target position prior to the occurrence of the detection.

We claim:

1. In a chirp radar system in which chirp pulse returns are received by a receiver and sent to processors for dechirping and measuring the radar return, the improvement comprising measurement means connected to receive the chirp pulse return before it is dechirped; delay means connected in said measurement means so as to delay an output of said measurement means by a time equal to the time a chirped return will be delayed through the radar processors; said output of the measuring means being connected to the radar processors for setting a threshold value therein; a thermal noise threshold circuit connected to an output of the receiver; comparator circuit means having first and second inputs connected to the outputs of the thermal noise threshold circuit and the measurement means whereby an output of the comparator circuit means will be equal to the largest of the values fed to its input; and said output of said comparator circuit means being connected to supply a threshold value to the radar processor circuits.

2. A system as set forth in claim 1 further comprising an encoder connected to the output of said measurement means; and said encoder having an output which is indicative of whether or not a particular pulse return has saturated the receiver.

3. A system as set forth in claim 2 further comprising a threshold scaler connected between the output of the measurement means and the comparator circuit means.

4. In a chirp radar system in which chirp pulse returns are received by a receiver and sent to processors for dechirping and measuring the radar return, the improvement comprising measurement means connected to receive the chirp pulse return before it is dechirped; delay means connected in said measurement means so as to delay an output of said measurement means by a time equal to the time a chirped return will be delayed through the radar processors; said output of the measuring means being connected to the radar processors for setting a threshold value therein; said measurement means comprises at least one averaging circuit; a logarithmic amplifier for converting the signal at its input into a value which is equal to the root mean square power of that input; and said averaging circuit means, said logarithmic amplifier, and said delay means being connected in a series circuit between the input and the output of the measuring means.

5. A system as set forth in claim 4 further comprising a second averaging means; and first switching means connected to the two averaging circuit means so as to selectively connect one or the other in the measuring circuit.

6. A system as set forth in claim 5 further comprising a second delay means; and second switching means connected to the two delay means so as to selectively connect one or the other into the circuit of the measuring means.

7. A system as set forth in claim 6 further comprising first and second scaler means; and third switching means connected to said first and second scaler means so as to selectively connect one of said scaler means in the circuit of the measuring means.

8. A system as set forth in claim 7 further comprising an encoder having an input and an output; said first and second scaler means being adapted to be connected between the output of the measuring means and a first junction between the scaler means and the delay means; said encoder having its input connected to said first junction; and said encoder being strobed at the same time said radar processor is being strobed.

* * * * *